(12) United States Patent
Ueda et al.

(10) Patent No.: US 7,778,763 B2
(45) Date of Patent: Aug. 17, 2010

(54) FUEL PROPERTY DETERMINATION SYSTEM, AND FUEL PROPERTY DETERMINATION METHOD FOR INTERNAL COMBUSTION ENGINE

(75) Inventors: Koichi Ueda, Susono (JP); Kota Sata, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 89 days.

(21) Appl. No.: 12/304,428

(22) PCT Filed: Jun. 12, 2007

(86) PCT No.: PCT/IB2007/001574

§ 371 (c)(1), (2), (4) Date: Dec. 11, 2008

(87) PCT Pub. No.: WO2007/144745

PCT Pub. Date: Dec. 21, 2007

(65) Prior Publication Data

US 2009/0287396 A1 Nov. 19, 2009

(30) Foreign Application Priority Data

Jun. 13, 2006 (JP) ............................. 2006-163380

(51) Int. Cl.
F02D 41/30 (2006.01)
F02D 41/14 (2006.01)
(52) U.S. Cl. ................... 701/104; 123/179.16; 123/494
(58) Field of Classification Search ......... 701/101–105, 701/110–115; 123/179.16, 436, 478–480, 123/491, 494; 73/114.13, 114.15, 114.42, 73/114.45, 114.49, 114.52; 702/182
See application file for complete search history.

(56) References Cited

U.S. PATENT DOCUMENTS

| 5,419,296 | A | | 5/1995 | Yamaura |
| 5,499,607 | A | | 3/1996 | Tomisawa |
| 5,542,394 | A | * | 8/1996 | Tomisawa .................... 123/491 |
| 5,711,272 | A | * | 1/1998 | Maegawa et al. ...... 123/406.53 |
| 6,079,396 | A | * | 6/2000 | Ament et al. ................ 123/674 |
| 7,055,483 | B2 | * | 6/2006 | Lewis et al. ............ 123/179.18 |

(Continued)

FOREIGN PATENT DOCUMENTS

DE   102 51 837 A1   5/2004

(Continued)

*Primary Examiner*—Stephen K Cronin
*Assistant Examiner*—Johnny H Hoang
(74) *Attorney, Agent, or Firm*—Kenyon & Kenyon LLP

(57) ABSTRACT

The fuel injection amounts into each cylinder are set on the assumption that a heavy fuel will be injected during the engine starting process, and a specific torque is allowed to be generated by combustion in a specific cylinder when a fuel with a specific property between those of the heaviest fuel and the lightest fuel is injected thereinto. When the torque generated in the specific cylinder is in a range at or around the specific torque, the property level of fuel to be injected during the engine starting process is determined to be in a level range at or around the specific property. When the torque generated in the specific cylinder is higher than the range around the specific torque, the property level is determined to be in a level range on the light fuel side of the level range around the specific property.

6 Claims, 4 Drawing Sheets

U.S. PATENT DOCUMENTS

| | | | |
|---|---|---|---|
| 7,448,360 B2 * | 11/2008 | Kita | 123/436 |
| 7,480,557 B2 * | 1/2009 | Yamaguchi et al. | 701/104 |
| 7,600,504 B2 * | 10/2009 | Gangi et al. | 123/486 |
| 2005/0071073 A1 * | 3/2005 | Ueda et al. | 701/101 |

FOREIGN PATENT DOCUMENTS

| | | |
|---|---|---|
| EP | 1 517 024 AA | 3/2005 |
| JP | 05-065838 A | 3/1993 |
| JP | 07-259629 A | 10/1995 |
| JP | 09-256898 | 9/1997 |
| JP | 11-241642 A | 7/1999 |
| JP | 2000-045825 A | 2/2000 |
| JP | 2004-211667 A | 7/2004 |
| JP | 2005-090413 A | 4/2005 |
| JP | 2005-098115 A | 4/2005 |
| JP | 2005-105822 A | 4/2005 |

* cited by examiner

FUEL PROPERTY DETERMINATION SYSTEM, AND FUEL PROPERTY DETERMINATION METHOD FOR INTERNAL COMBUSTION ENGINE

This is a 371 national phase application of PCT/IB2007/001574 filed 12 Jun. 2007, claiming priority to Japanese Patent Application No. 2006-163380 filed 13 Jun. 2006, the contents of which are incorporated herein by reference.

BACKGROUND OF THE INVENTION

1. Field of the Invention

The present invention relates to a fuel property determination system, and a fuel property determination method for an internal combustion engine.

2. Description of the Related Art

As fuels for internal combustion engines, there are heavy fuels, which are difficult to vaporize, and light fuels, which are easy to vaporize. When the engine is idling after start up, the fuel injection amount is controlled so that the idling speed is maintained at a desired value. After the warm-up of the engine, since even a heavy fuel can be sufficiently vaporized, air-fuel ratio control is executed based on the output from an air-fuel ratio sensor disposed in the engine exhaust system. Therefore, after the warm-up of the engine, fuel is not excessively supplied to the internal combustion engine, whether a heavy fuel or a light fuel.

When a heavy fuel is unintentionally supplied to an internal combustion engine during the engine starting process from cranking until the engine speed reaches the idling speed, the fuel cannot be sufficiently vaporized, which makes it difficult to start the engine. Therefore, in general, the fuel injection amounts during the engine starting process are set on the assumption that a heavy fuel will be injected.

When a light fuel is injected in spite of the fuel injection amounts set as above, an excessive amount of fuel is injected, and a relatively large amount of unburned fuel is discharged into the engine exhaust system. Therefore, it is desired to correct the fuel injection amounts during the engine starting process based on the fuel property. An art for determining the property of fuel to be injected from a fuel injection valve after the start of engine has been proposed (see JP-A-Hei 9-256898, for example).

However, even when the fuel property is determined after the start of engine, if refueling is thereafter done before the stop of the engine, the determined fuel property is changed from the actual fuel property. When fuel injection amounts are corrected based on a fuel property different from the actual fuel property at the next start of the engine, the engine may be difficult to start, or a large amount of unburned fuel may be discharged during the engine starting process.

SUMMARY OF THE INVENTION

The present invention provides a fuel property determination system, and a fuel property determination method for an internal combustion engine with which the fuel property can be determined when the engine is started to reduce the amount of unburned fuel discharged during the engine starting process.

A fuel property determination system for an internal combustion engine according to a first aspect of the present invention is a fuel property determination system for a multi-cylinder internal combustion engine that sets fuel injection amounts into each of cylinders during the engine starting process on the assumption that a heavy fuel will be injected, characterized in that: allows a specific torque to be generated by combustion in a specific cylinder when a fuel with a specific property between those of the heaviest fuel and the lightest fuel is injected thereinto, determines that the property level of fuel to be injected into each cylinder during the engine starting process is in a level range at or around the specific property when the torque actually generated in the specific cylinder is in a range at or around the specific torque, determines that the property level is in a level range that is lighter than the level range at or around the specific property when the torque actually generated in the specific cylinder is higher than the range at or around the specific torque, and determines that the property level is in a level range that is heavier than the level range at or around the specific property when the torque actually generated in the specific cylinder is lower than the range at or around the specific torque.

In this configuration, a specific torque is generated by combustion in the specific cylinder when a fuel with a specific property between those of the heaviest fuel and the lightest fuel is injected into the specific cylinder at the start of the engine. Then, it can be determined whether the fuel property level is in a level range at or around the specific property or in a level range on the heavy fuel side or a light fuel side of the level range at or around the specific property based on the torque actually generated in the specific cylinder. Based on the thus determined fuel property level, the fuel injection amounts into each cylinder during the engine starting process, initially set on the assumption that a heavy fuel will be injected, may be corrected. As a result, an excessive amount of fuel is prevented from being injected, and discharge of unburned fuel during the engine starting process is reduced.

The first aspect may further allow a specific torque to be generated by combustion in at least a second specific cylinder when a fuel with a second specific property between those of the heaviest fuel and the lightest fuel is injected thereinto, determine that the property level of fuel to be injected into each cylinder during the engine starting process is in a level range at or around the second specific property when the torque actually generated in the second specific cylinder is in a range at or around the specific torque, determine that the property level is in a level range on the light fuel side of the level range at or around the second specific property when the torque actually generated in the second specific cylinder is higher than the range at or around the specific torque, and determine that the property level is in a level range on the heavy fuel side of the level range at or around the second specific property when the torque actually generated in the second specific cylinder is lower than the range at or around the specific torque.

In this configuration, a specific torque is generated by combustion in at least a second specific cylinder when a fuel with a second specific property between those of the heaviest fuel and the lightest fuel is injected thereinto. Then, it can be determined whether the fuel property level is in a level range at or around the second specific property or in a level range on the heavy fuel side or a light fuel side of the level range at or around the second specific property based on the torque actually generated in the second specific cylinder in addition to whether the fuel property level is in a level range at or around the specific property or in a level range on the heavy fuel side or a light fuel side of the level range at or around the specific property based on the torque actually generated in the specific cylinder. As a result, the fuel property level can be determined in more detail.

The first aspect may decrease a fuel injection amount so that the specific torque can be generated by combustion in the specific cylinder when the fuel with a specific property is injected thereinto, allow a specific torque to be generated by combustion in at least a second specific cylinder when the fuel with a specific property is injected thereinto without decreasing the fuel injection amount thereinto, determine that the property level of fuel to be injected into each cylinder during the engine starting process is in a level range at or around the specific property when the torque actually generated in the second specific cylinder is in a range at or around the specific torque, determine that the property level is in a level range on the light fuel side of the level range at or around the specific property when the torque actually generated in the second specific cylinder is higher than the range at or around the specific torque, determine that the property level is in a level range on the heavy fuel side of the level range at or around the specific property when the torque actually generated in the second specific cylinder is lower than the range at or around the specific torque, and determine, only when the fuel property level determined in the specific cylinder and the fuel property level determined in the second specific cylinder coincide with each other, the coincident fuel property level as the property level of the fuel to be injected into each cylinder during the engine starting process.

In this configuration, a specific torque is generated by combustion in the specific cylinder when a fuel with the specific property is injected thereinto in a reduced amount, and a specific torque is generated by combustion in at least a second specific cylinder when a fuel with the specific property is injected thereinto without any decrease in amount. Then, it can be determined whether the fuel property level is in a level range at or around the specific property or in a level range on the heavy fuel side or a light fuel side of the level range at or around the specific property based on the torque actually generated in the specific cylinder and whether the fuel property level is in a level range at or around the second specific property or in a level range on the heavy fuel side or a light fuel side of the level range at or around the second specific property based on the torque actually generated in the second specific cylinder. Then, only when the property level of fuel determined in the specific cylinder and the property level of fuel determined in the second specific cylinder coincide with each other, the coincident fuel property level is determined as the property level of the fuel to be injected into each cylinder during the engine starting process. When the fuel property levels determined in the specific cylinder and the second specific cylinder do not coincide with each other, determination of fuel property level is cancelled since the intended decrease in the fuel injection amount in the specific cylinder may not have been achieved or some other failure may have occurred.

The first aspect may allow a specific torque to be generated by combustion in at least a second specific cylinder in which combustion occurs after combustion in the specific cylinder when the fuel with a specific property is injected thereinto, determine that the property level of fuel to be injected into each cylinder during the engine starting process is in a level range at or around the specific property when the torque actually generated in the second specific cylinder is in a range at or around the specific torque, determine that the property level is in a level range on the light fuel side of the level range at or around the specific property when the torque actually generated in the second specific cylinder is higher than the range at or around the specific torque, determine that the property level is in a level range on the heavy fuel side of the level range at or around the specific property when the torque actually generated in the second specific cylinder is lower than the range at or around the specific torque, and determine a weighted average of the fuel property level determined in the specific cylinder and the fuel property level determined in the second specific cylinder obtained by giving a higher weight to the former than to the latter as the property level of fuel to be injected into each cylinder during the engine starting process.

In this configuration, a specific torque is generated in at least a second specific cylinder in which combustion occurs after combustion in the specific cylinder when a fuel with the specific property is injected thereinto. Then, it can be determined whether the fuel property level is in a level range at or around the specific property or in a level range on the heavy fuel side or a light fuel side of the level range at or around the specific property in each of the specific cylinder and the second specific cylinder. The fuel property levels determined in the specific cylinder and the second specific cylinder are supposed to coincide with each other. If not, since the torque generated in a cylinder in which combustion occurs earlier is less affected by combustion in other cylinders and therefore the fuel property level determined in the specific cylinder has higher reliability, a weighted average of the fuel property level determined in the specific cylinder and the fuel property level determined in the second specific cylinder obtained by giving a higher weight to the former than to the latter is determined as the property level of fuel to be injected into each cylinder during the engine starting process.

The first aspect may start correction of fuel injection amounts during the engine starting process, based on the fuel property level determined by a fuel property determination system for an internal combustion engine, immediately after the determination.

In this configuration, correction of fuel injection amounts during the engine starting process is started, based on the determined fuel property level, immediately after the determination. Therefore, injection of an excessive amount of fuel may be prevented relatively early because of the correction, and discharge of unburned fuel during the engine starting process is reduced thereby.

A fuel property determination method for an internal combustion engine according a second aspect of the present invention includes: setting fuel injection amounts into each of cylinders during the engine starting process on the assumption that a heavy fuel will be injected; allowing a specific torque to be generated by combustion in a specific cylinder when a fuel with a specific property between those of the heaviest fuel and the lightest fuel is injected thereinto; determining that the property level of fuel to be injected into each cylinder during the engine starting process is in a level range at or around the specific property when the torque actually generated in the specific cylinder is in a range at or around the specific torque; determining that the property level is in a level range on the light fuel side of the level range at or around the specific property when the torque actually generated in the specific cylinder is higher than the range at or around the specific torque, and determining that the property level is in a level range on the heavy fuel side of the level range at or around the specific property when the torque actually generated in the specific cylinder is lower than the range at or around the specific torque.

In this configuration, a specific torque is generated by combustion in the specific cylinder when a fuel with a specific property between those of the heaviest fuel and the lightest fuel is injected into the specific cylinder at the start of the engine. Then, it can be determined whether the fuel property level is in a level range at or around the specific property or in a level range on the heavy fuel side or a light fuel side of the level range at or around the specific property based on the torque actually generated in the specific cylinder. Based on the thus determined fuel property level, the fuel injection amounts into each cylinder during the engine starting process set on the assumption that a heavy fuel will be injected can be corrected. As a result, an excessive amount of fuel is prevented from being injected, which reduces the discharge of unburned fuel during the engine starting process.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

Figure 1:
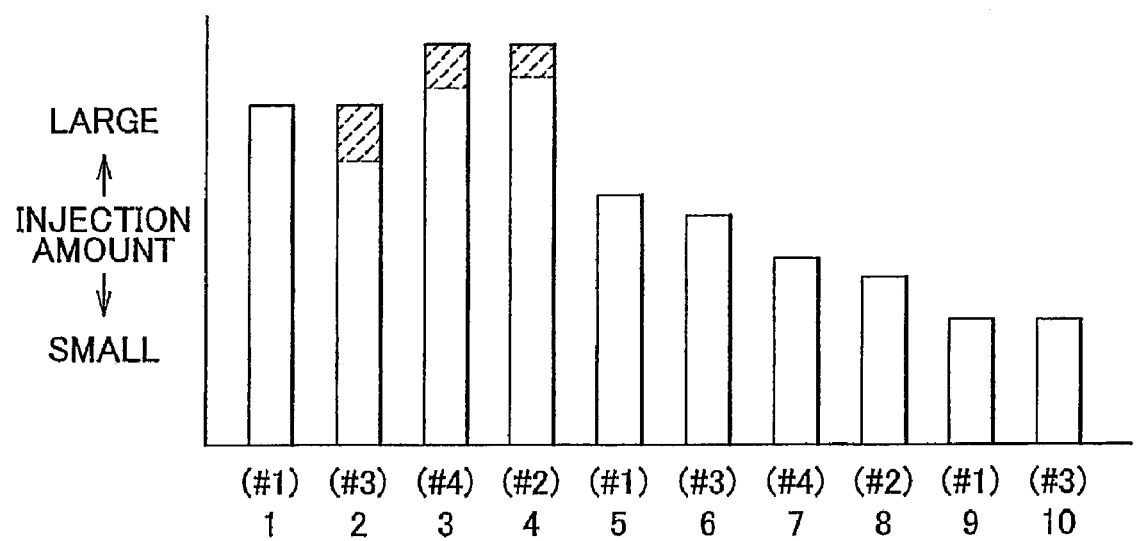
FIG. 1 is a graph showing fuel injection amounts during the engine starting process.

FIG. 1 is a graph showing the fuel injection amounts into each cylinder during the engine starting process. A fuel property determination system according to the present invention is applicable to a multi-cylinder spark ignition internal combustion engine having, for example, four cylinders. In FIG. 1, reference numerals 1 to 10 indicate the first to tenth fuel injection amounts, respectively. The firing order of the internal combustion engine is, for example, #1 cylinder-#3 cylinder-#4 cylinder-#2 cylinder. When the first cylinder into which fuel is injected is the #1 cylinder, the second cylinder into which fuel is injected is the #3 cylinder, the third cylinder into which fuel is injected is the #4 cylinder, and the fourth cylinder into which fuel is injected is the #2 cylinder. The fifth and subsequent cylinders into which fuel is injected are determined according to the firing order.

During the engine starting process, from cranking until the engine speed is stabilized at the idling speed, each fuel injection amount is so set that the engine speed will increase only by a prescribed amount every time combustion occurs in the cylinders. Fuels, including gasoline, are classified into light fuels, which are easy to vaporize, and heavy fuels, which are difficult to vaporize. If a heavy fuel is injected when each fuel injection amount during the engine starting process is set on the assumption that a light fuel will be injected, the air-fuel mixture in the cylinders will be too much leaner than a desired air-fuel ratio to be ignited and the engine may not start. Therefore, in general, each fuel injection amount during the engine starting process is set as shown in FIG. 1 on the assumption that a heavy fuel will be injected.

In this way, reliable starting of the engine is ensured. However, when a light fuel is injected, an excessive amount of fuel is injected and the discharged amount of unburned fuel increases. The fuel property determination system according to the present invention is an electronic control device for an internal combustion engine which can determine the fuel property at the start of engine and subsequently correct each fuel injection amount during the engine starting process based on the fuel property to reduce the discharged amount of unburned fuel.

Figure 2:
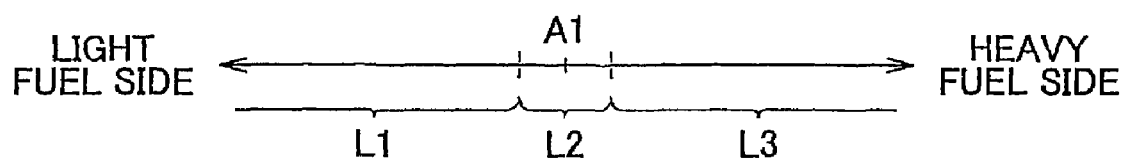
FIG. 2 is a view showing a classification of fuel property levels.

In a first embodiment of the fuel property determination system according to the present invention, a fuel injection amount 3 into the #4 cylinder in the first cycle during the engine starting process is decreased by an amount indicated by dotted lines so that a predetermined torque required to maintain the engine speed may be generated by combustion in the #4 cylinder when a medium fuel having a property A1 representing a volatility between those of the possible heaviest fuel and the possible lightest fuel as shown in FIG. 2 is injected in order to determine the fuel property. Then, it is determined whether the predetermined torque was generated by the actual combustion in the #4 cylinder. For this purpose, the difference dN between the engine speed at a specific crank angle (an angle between the compression top dead center and a crank angle of 30 degrees, for example) at which the #4 cylinder is in an early stage of an expansion stroke and the engine speed immediately before the #4 cylinder reaches the compression top dead center position, for example, is detected, and the difference dN is compared with a reference value 0.

When the difference dN is in a range at or around the reference value 0, it means that the engine speed was maintained and a torque in a range at or around the predetermined torque was generated by the combustion in the #4 cylinder. In this case, the property level of fuel to be injected during the engine starting process is set to L2 representing a medium fuel. When the difference dN has a minus value outside the range at or around 0, it is determined that only a torque below the range at or around the predetermined torque was generated in the #4 cylinder and a heavy fuel which is more difficult to vaporize than a medium fuel was injected. In this case, the property level of fuel to be injected during the engine starting process is set to L3 representing a heavy fuel. When the difference dN has a plus value outside the range at or around 0, it is determined that a torque above the range at or around the predetermined torque was generated in the #4 cylinder and a light fuel, which is easier to vaporize than a medium fuel, was injected. In this case, the property level of fuel to be injected during the engine starting process is set to L1 representing a light fuel.

In an internal combustion engine equipped with the fuel property determination system of this embodiment, fuel is preliminarily injected into the intake port during, for example, the exhaust stroke. At this time, when the #4 cylinder is selected as a specific cylinder in the first cycle and the fuel injection amount 3 is decreased, the fuel property level may be determined during the expansion stroke in the #4 cylinder corresponding to this fuel injection. When the thus determined property level is set to a final property level, correction based on the fuel property level can be performed from the fuel injection during the exhaust stroke in the #4 cylinder in the second cycle. That is, in the second and subsequent cycles, no correction is performed when the determined property level is L3 representing a heavy fuel. When the property level is L2 representing a medium fuel, the amount of fuel to be injected is decreased after the injection of the fuel injection amount 7 during the engine starting process so that the engine speed increases only by a prescribed amount every time combustion takes place in the cylinders. When the property level is L1 representing a light fuel, each fuel injection amount is further decreased so that the engine speed increases only by a prescribed amount every time combustion takes place in the cylinders. As a result, it is possible to prevent an excessive amount of fuel from being injected and reduce the discharged amount of unburned fuel during the engine starting process.

Although the #4 cylinder during fuel injection in the first cycle is selected as the specific cylinder in this embodiment, this is not intended to limit the present invention. Another cylinder during fuel injection in the first cycle may be selected as the specific cylinder. Any cylinder during fuel injection in the first or subsequent cycle may be selected as the specific cylinder.

Figure 3:
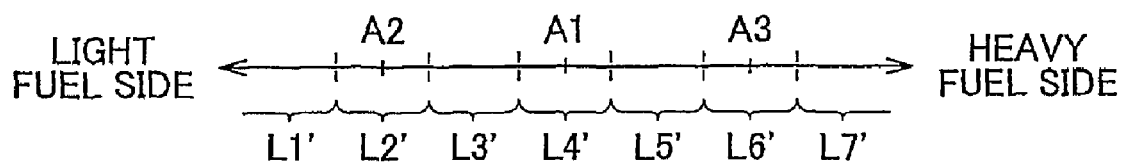
FIG. 3 is a view showing another classification of fuel property levels.

In a second embodiment of the fuel property determination system according to the present invention, a fuel injection amount 2 into the #3 cylinder in the first cycle during the engine starting process is decreased by an amount indicated by dotted lines so that a predetermined torque required to maintain the engine speed is generated by combustion in the #3 cylinder when a light fuel having a property A2, between those of the lightest fuel and a medium fuel as shown in FIG. 3, is injected, and a fuel injection amount 4 into the #2 cylinder in the first cycle during the engine starting process is decreased by an amount indicated by dotted lines so that a predetermined torque required to maintain the engine speed can be generated by combustion in the #2 cylinder when a heavy fuel having a property A3, between those of the heaviest fuel and a medium fuel as shown in FIG. 3, is injected, for more accurate fuel property determination.

Then, not only the aforementioned difference dN(#4) caused by combustion in the #4 cylinder, but also a difference dN(#3) between the engine speed at a specific crank angle at which the #3 cylinder is in an early stage of an expansion stroke and the engine speed immediately before the #3 cylinder reaches the compression top dead center position and a difference dN(#2) between the engine speed at a specific crank angle at which the #2 cylinder is in an early stage of expansion stroke and the engine speed immediately before the #2 cylinder reaches the compression top dead center position are detected, and the differences dN(#4), dN(#3) and dN(#2) are compared with a reference value 0.

Figure 4:
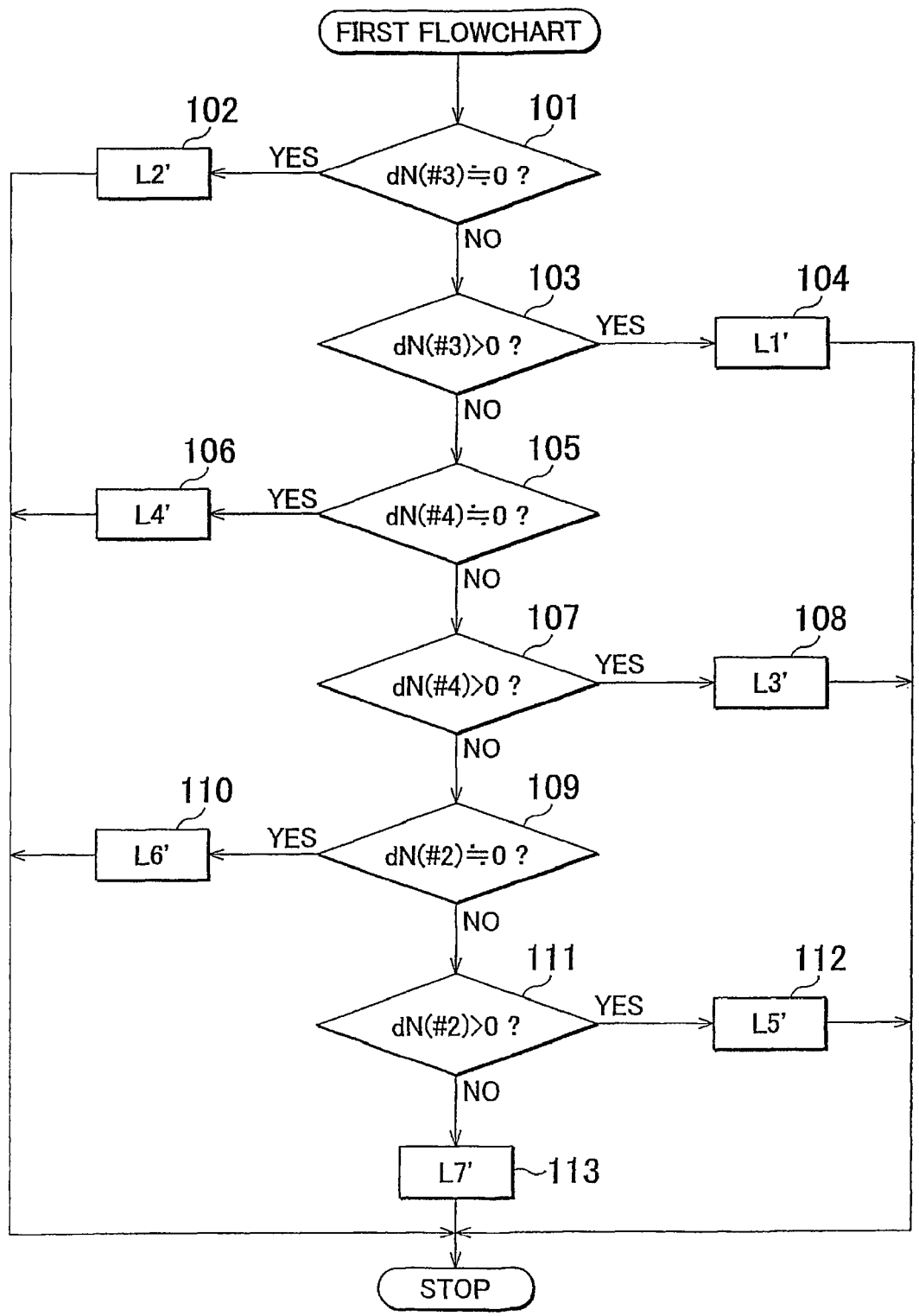
FIG. 4 is a first flowchart for the determination of the fuel property level.

As shown in a first flowchart of FIG. 4, it is determined whether the difference dN(#3) detected first is in a range at or around the reference value 0 in step 101. If the determination is affirmative, it is determined that a fuel having a property close to the property A2 was injected into the #3 cylinder, and the property level of fuel to be injected during the engine starting process is set to L2' in step 102. If the determination in step 101 is negative, it is determined whether the difference dN(#3) has a plus value outside the range at or around the reference value 0 in step 103. If the determination is affirmative, it is determined that a fuel which is easier to vaporize than a fuel with the property A2 was injected into the #3 cylinder, and the property level of fuel to be injected during the engine starting process is set to L1' in step 104.

If the determination in step 103 is negative, it is determined whether the difference dN(#4) detected secondly is in a range at or around the reference value 0 in step 105. If the determination is affirmative, the property level of fuel to be injected during the engine starting process is set to L4' in step 106. If the determination in step 105 is negative, it is determined whether the difference dN(#4) has a plus value outside the range at or around the reference value 0 in step 107. If the determination is affirmative, it is determined that a fuel which is more difficult to vaporize than a fuel with the property A2 but easier to vaporize than a fuel with the property A1 was injected into the #4 cylinder, and the property level of fuel to be injected during the engine starting process is set to L3' in step 108.

If the determination in step 107 is negative, it is determined whether the difference dN(#2) detected thirdly is in a range at or around the reference value 0 in step 109. If the determination is affirmative, the property level of fuel to be injected during the engine starting process is set to L6' in step 110. If the determination in step 109 is negative, it is determined whether the difference dN(#2) has a positive value outside the range at or around the reference value 0 in step 111. If the determination is affirmative, it is determined that a fuel which is more difficult to vaporize than a fuel with the property A1 but easier to vaporize than a fuel with the property A3 was injected into the #2 cylinder, and the property level of fuel to be injected during the engine starting process is set to L5' in step 112. If the determination in step 111 is negative, it is determined that a fuel which is more difficult to vaporize than a fuel with the property A3 was injected into the #2 cylinder, and the property level of fuel to be injected during the engine starting process is set to L7' in step 113.

As described above, the fuel property level can be determined in more detail, and, when the determined property level is set to a final property level, correction based on the more detailed fuel property level can be performed from the fuel injection into the #3 cylinder during the exhaust stroke in the first cycle at the earliest and from the fuel injection into the #2 cylinder during the exhaust stroke in the second cycle at the latest. For example, when each fuel injection amount during the engine starting process has been set on the assumption that a level L6' heavy fuel with the property A3 will be injected, if the determined property level is other than L6', each fuel injection amount is decreased (in the case where the property level is one of L1' to L5') or increased (in the case where the property level is L7') so that the engine speed increases only by a prescribed amount every time combustion occurs in the cylinders. As a result, it is possible to prevent an excessive amount of fuel from being injected more reliably and further reduce the amount of unburned fuel discharge during the engine starting process.

Although the #3 cylinder, #4 cylinder and #2 cylinder during fuel injection in the first cycle are selected as three specific cylinders in this embodiment, this is not intended to limit the present invention. What is necessary is to decrease the fuel injection amounts into at least two specific cylinders so that a predetermined torque required to maintain the engine speed is generated by combustion in each of the cylinders on the assumption that fuels with different properties between those of the heaviest fuel and the lightest fuel will be injected into the cylinders and to detect whether the predetermined torque was actually generated in each of the cylinders. Then, the fuel property level can be determined in more detail than it can be determined in one specific cylinder. It is needless to say that the more the number of the specific cylinders, the more in detail the property level of the fuel can be determined.

Figure 5:
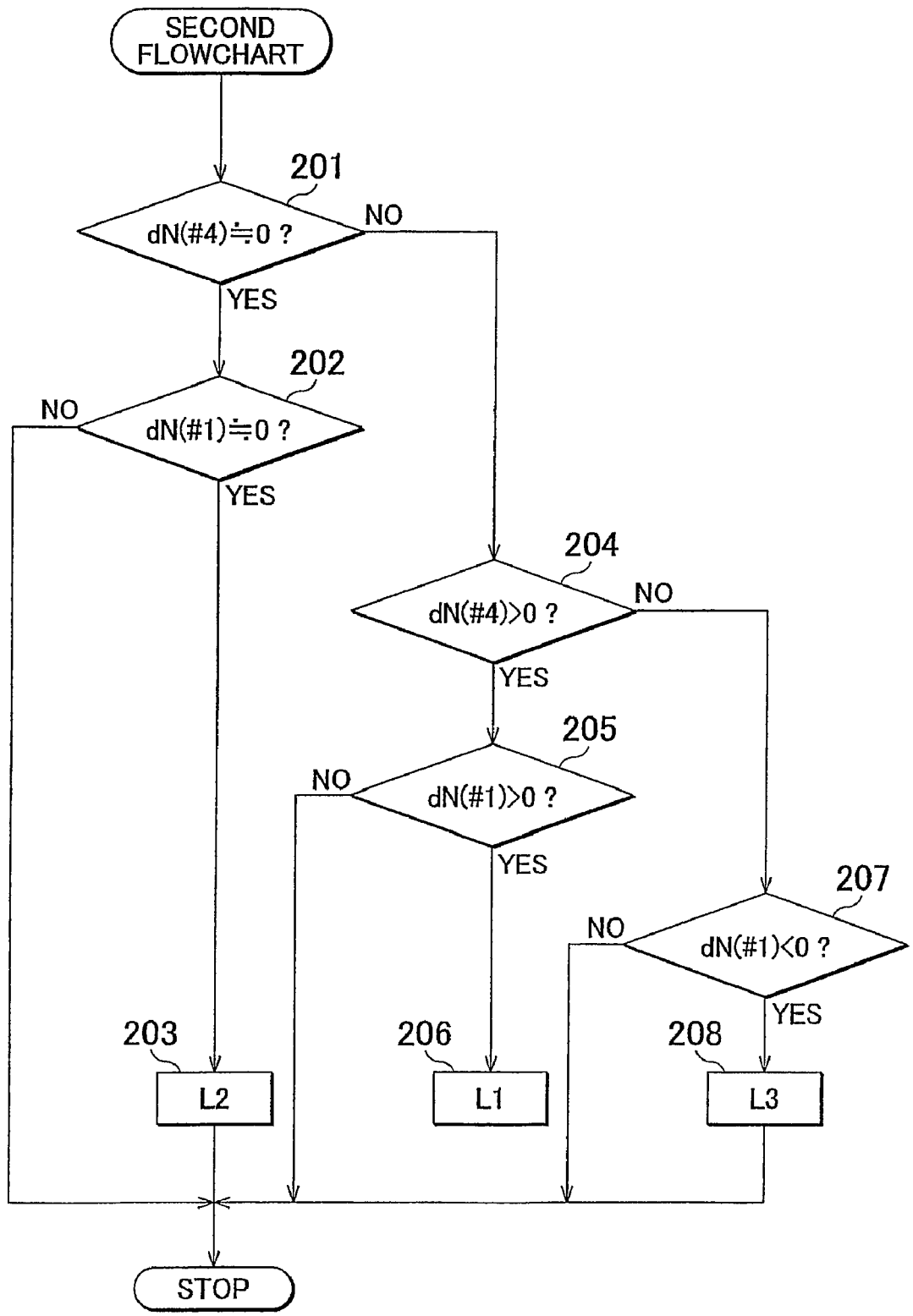
FIG. 5 is a second flowchart for the determination of the fuel property level.

Although the valve-open timing of fuel injection valves is controlled according to valve-open command time so that a desired fuel injection amount can be achieved, a small amount of fuel may leak when the valves are closed or the actual valve-open timing may be slightly shifted from the intended valve-open timing. If the decrease in the fuel injection amount into the #4 cylinder for determination of the fuel property is not achieved as intended, the fuel property level determined as one of three levels (L1, L2, L3) based on combustion in the #4 cylinder as described before cannot be correct. Therefore, in a third embodiment of the fuel property determination system according to the present invention, the fuel property level is determined according to a second flowchart shown in FIG. 5.

It is determined whether the difference dN(#4) is in a range at or around the reference value 0 in step 201. When this determination is affirmative, the fuel property level is not determined as L2 representing a medium fuel at once and it is determined whether, for example, the difference dN(#1) between the engine speed at a specific crank angle at which the #1 cylinder, in which the expansion stroke occurs after the expansion stroke in the #4 cylinder, is in an early stage of expansion stroke (in the second cycle) and the engine speed immediately before the #1 cylinder reaches the compression top dead center position is in a range at or around the reference value 0 in step 202. The fuel injection amount into the #1 cylinder is not decreased but the intake air amount to the #1 cylinder is increased as compared to other cylinders so that the actual air-fuel ratio in the #1 cylinder is slightly leaner than the theoretical air-fuel ratio and a torque required to maintain the engine speed may be generated by combustion in the #1 cylinder when a medium fuel with a property A1 as shown in FIG. 2 is injected. An intake flow control valve, for example, is dispose in the intake port for each cylinder so that only the intake air amount to the #1 cylinder may be varied.

If the determination in step 202 is affirmative, it means that a medium fuel with a property close to the property A1 was injected into the #1 cylinder, into which fuel was injected without any decrease in amount. At this time, the property of fuel to be injected during the engine starting process is set to L2 representing a medium fuel in step 203. However, if the determination in step 202 is negative, the possibility is that the intended decrease in the fuel injection amount was not achieved in the #4 cylinder or the intended increase in the intake air amount was not achieved in the #1 cylinder. In this case, the routine is ended without making a determination of the fuel property.

If the determination in step 201 is negative, it is determined whether the difference dN(#4) caused by combustion in the #4 cylinder has a plus value outside a range at or around the reference value 0 in step 204. If the determination is affirmative, the fuel property level is not set as L1 representing a light fuel at once and it is then determined whether the difference dN(#1) caused by combustion in the #1 cylinder has a plus value outside a range at or around the reference value 0 in step 205.

If the determination in step 205 is affirmative, it means that the actual air-fuel ratio in the #1 cylinder was equal to the theoretical air-fuel ratio or slightly richer than the theoretical air-fuel ratio and a torque sufficiently high to increase the engine speed was generated by the combustion in the #1 cylinder. That is, it means that a light fuel, which is easier to vaporize than a medium fuel, was injected into the #1 cylinder, into which fuel was injected without any decrease in amount. At this time, the property of fuel to be injected during the engine starting process is set to L1 representing a light fuel in step 205. However, when the determination in step 205 is negative, the possibility is that the intended decrease in the fuel injection amount was not achieved in the #4 cylinder or the intended increase in the intake air amount was not achieved in the #1 cylinder. In this case, the routine ends without making a determination of the fuel property.

If the determination in step 204 is negative, the fuel property level is not determined as L3 representing a heavy fuel at once and it is determined whether the difference dN(#1) caused by combustion in the #1 cylinder has a plus value outside a range at or around the reference value 0 in step 207.

If the determination in step 207 is affirmative, it means that the actual air-fuel ratio in the #1 cylinder is much leaner than the theoretical air-fuel ratio and the torque generated by combustion in the #1 cylinder was insufficient to maintain the engine speed. That is, it means that a heavy fuel, which is more difficult to vaporize than a medium fuel, was also injected into the #1 cylinder, into which fuel was injected without any decrease in amount. In this case, the property of fuel to be injected during the engine starting process is set to L3 representing a heavy fuel in step 208. However, if the determination in step 207 is negative, the possibility is that the intended decrease in the fuel injection amount was not achieved in the #4 cylinder or the intended increase in the intake air amount was not achieved in the #1 cylinder. In this case, the routine ends without making a determination of the fuel property. As described above, an erroneous determination of the fuel property level may be avoided.

In this embodiment, the #4 cylinder during fuel injection in the first cycle and the #1 cylinder during fuel injection in the second cycle are selected as two specific cylinders, the fuel injection amount into one of the specific cylinders is decreased and the intake air amount to the other specific cylinder is increased so that a predetermined torque required to maintain the engine speed can be generated by combustion in each of the cylinders on the assumption that fuel having the same value of the specific property between those of the heaviest fuel and the lightest fuel will be injected into the cylinders, and it is detected whether the predetermined torque was actually generated in each of the cylinders. However, what is needed for the other specific cylinder is not to decrease the fuel injection amount. For example, the ignition timing may be retarded so that a predetermined torque required to maintain the engine speed may be generated when the fuel with the specific property is injected in an amount set on the assumption that a heavy fuel will be injected.

As a result, it may be determined that a fuel with a property level in a range at or around the specific property was injected when the torque actually generated in the other specific cylinder is in a range at or around the predetermined torque, it may be determined that a fuel with a property level on the light fuel side of the range at or around the specific property was injected when a torque higher than the predetermined torque is generated, and it is determined that a fuel with a property level on the heavy fuel side of the range at or around the specific property was injected when a torque lower than the predetermined torque is generated. In this embodiment, the one and the other specific cylinders may be the same cylinder in different fuel injection cycles (for example, in the first cycle and the second cycle).

A determination of the fuel property level based on combustion in a plurality of cylinders has higher degree of accuracy than that based on combustion in one specific cylinder (#4 cylinder), as in the first embodiment. Therefore, in the fourth embodiment of the fuel property determination system according to the present invention, the fuel injection amounts into the #3 cylinder, the #4 cylinder and the #2 cylinder in the first cycle, for example, are so set that a predetermined torque required to maintain the engine speed can be generated by combustion in each of the cylinders when a medium fuel with a property A1 as shown in FIG. 2 is injected. Then, the differences dN(#3), dN(#4) and dN(#2) between the engine speeds at specific crank angles at which the cylinders are in an early stage of expansion stroke and the engine speeds immediately before the cylinders reach the compression top dead center position are detected, and the fuel property level is determined in each cylinder in the same manner as described above.

The property levels determined in the cylinders as above are subjected to weighted averaging. The torque generated in a cylinder in which combustion occurs later tends to be affected by combustion in other cylinders. Thus, the property level L(#3) determined in the #3 cylinder is multiplied by a large coefficient, such as 0.7, whereas the property level L(#4) determined in the #4 cylinder is multiplied by a coefficient, such as 0.2 and the property level L(#2) determined in the #2 cylinder is multiplied by a small coefficient, such as 0.1. Then, the property level calculated using the equation below is set to the final fuel property level L.

$$L = L(\#3) \times 0.7 + L(\#4) \times 0.2 + L(\#2) \times 0.1$$

Here, although each of L(#3), L(#4) and L (#2) is an integer 1, 2, or 3, the final fuel property level has a value including a decimal fraction. For example, when L(#3) is level 1 and L(#4) and L(#2) are level 2, the final fuel property level L is 1.3. When L(#3) and L(#4) are level 1 and L(#2) is level 2, the final fuel property level L is 1.1. The levels 1.3 and 1.1 are both in a level range between the level 2 representing a medium fuel and the level 1 representing a light fuel and closer to level 1 than to level 2. Based on the final fuel property level L, correction can be performed from the fuel injection amount 8 into the #2 cylinder in the second cycle. Each coefficient for the weighted average of the fuel property levels determined in each cylinder are determined by an adaptability test.

In this embodiment, the #3 cylinder, the #4 cylinder, and the #2 cylinder during fuel injection in the first cycle are selected as three specific cylinders, the fuel injection amount into each of the cylinders is decreased so that a predetermined torque required to maintain the engine speed is generated by combustion in each of the cylinders on the assumption that the same fuel with a specific property between that of the heaviest fuel and the lightest fuel will be injected into the cylinders, and it is detected whether the predetermined torque is actually generated in each cylinder. It is needless to say that when the fuel injection amounts into at least two specific cylinders are decreased and it is detected whether the predetermined torque is generated in each of the cylinders, the fuel property level may be determined with much greater accuracy than when determined using only one specific cylinder. It is understood that the more the number of the specific cylinders, the more accurately the property level of the fuel can be determined.

Although a plurality of specific cylinders are used to determine the fuel property level in the second, third, and fourth embodiments, the plurality of specific cylinders may be different cylinders in the same fuel injection cycle, the same cylinder in different fuel injection cycles, different cylinders in different fuel injection cycles, or any combination thereof.

Also, the intake air amount to the #1 cylinder is increased or the ignition timing in the #1 cylinder is delayed to determine the property of fuel injected into the #1 cylinder in the third embodiment, and the fuel property may be determined in the same manner as above in each specific cylinder in the first embodiment, the second embodiment, and the fourth embodiment. The internal combustion engine to which the present invention is applicable may be a cylinder injection type spark ignition internal combustion engine. When the internal combustion engine is a type in which fuel is injected into the intake port for each cylinder during exhaust stroke, the more the fuel injection timing is delayed, the more difficult it will be to vaporize the injected fuel. Therefore, in the first, second, third, and fourth embodiments, the fuel injection timing may delayed more than usual in one or a plurality of specific cylinders so that a predetermined torque required to maintain the engine speed can be generated when a fuel with a specific property is injected into each of the cylinders in an amount set on the assumption that a heavy fuel will be injected, and the torques actually generated in the specific cylinders may be detected to determine whether the property level of the injected fuel is in a range at or around the specific property or on the heavy oil side or the light oil side of the level range at or around the specific property.

Although a determination on whether a torque in a range at or around the predetermined torque is generated, a torque higher than the range at or around the predetermined torque is generated, or a torque lower than the predetermined torque is generated by combustion in each specific cylinder is made based on whether or not the engine speed is maintained, decreased or increased by combustion in each specific cylinder, the determination may be made based on whether the angular acceleration of the crankshaft during combustion (in an early stage of expansion stroke) in each specific cylinder is in a range at or around 0, a minus value outside the range at or around 0, or a plus value outside the range including 0. Although the predetermined torque is the torque required to maintain the engine speed that is generated by combustion in each specific cylinder, a torque with any magnitude may be set to a predetermined torque as long as it can be determined whether a torque in a range at or around the predetermined torque is generated, a torque higher than the predetermined torque is generated, or a torque lower than the predetermined torque is generated.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A fuel property determination system for a multi-cylinder internal combustion engine that sets fuel injection amounts into each of the cylinders during the engine starting process on the assumption that a heavy fuel will be injected, wherein the fuel property determination system allows a specific torque to be generated by combustion in a specific cylinder when a fuel with a specific property between those of the heaviest fuel and the lightest fuel is injected thereinto, determines that the property level of fuel to be injected into each cylinder during the engine starting process is in a level range at and around the specific property when the torque actually generated in the specific cylinder is in a range at and around the specific torque, determines that the property level is in a level range on the light fuel side of the level range at and around the specific property when the torque actually generated in the specific cylinder is higher than the range at and around the specific torque, determines that the property level is in a level range on the heavy fuel side of the level range at and around the specific property when the torque actually generated in the specific cylinder is lower than the range at and around the specific torque, decreases a fuel injection amount so that the specific torque is generated by combustion in the specific cylinder when the fuel with a specific property is injected thereinto, allows a specific torque to be generated by combustion in at least a second specific cylinder when the fuel with a specific property is injected thereinto without decreasing the fuel injection amount thereinto, determines that the property level of fuel to be injected into each cylinder during the engine starting process is in a level range at or around the specific property when the torque actually generated in the second specific cylinder is in a range at or around the specific torque, determines that the property level is in a level range on the light fuel side of the level range at or around the specific property when the torque actually generated in the second specific cylinder is higher than the range at or around the specific torque, determines that the property level is in a level range on the heavy fuel side of the level range at or around the specific property when the torque actually generated in the second specific cylinder is lower than the range at or around the specific torque, and determines, only when the fuel property level determined in the specific cylinder and the fuel property level determined in the second specific cylinder coincide with each other the coincident fuel property level as the property level of the fuel to be injected into each cylinder during the engine starting process.

2. A fuel property determination system for a multi-cylinder internal combustion engine that sets fuel injection amounts into each of the cylinders during the engine starting process on the assumption that a heavy fuel will be injected, wherein the fuel property determination system allows a specific torque to be generated by combustion in a specific cylinder when a fuel with a specific property between those of the heaviest fuel and the lightest fuel is injected thereinto, determines that the property level of fuel to be injected into each cylinder during the engine starting process is in a level range at and around the specific property when the torque actually generated in the specific cylinder is in a range at and around the specific torque, determines that the property level is in a level range on the light fuel side of the level range at and around the specific property when the torque actually generated in the specific cylinder is higher than the range at and around the specific torque, determines that the property level is in a level range on the heavy fuel side of the level range at and around the specific property when the torque actually generated in the specific cylinder is lower than the range at and around the specific torque, allows a specific torque to be generated by combustion in at least a second specific cylinder in which combustion occurs after combustion in the specific cylinder when the fuel with a specific property is injected thereinto, determines that the property level of fuel to be injected into each cylinder during the engine starting process is in a level range at or around the specific property when the torque actually generated in the second specific cylinder is in a range at or around the specific torque, determines that the property level is in a level range on the light fuel side of the level range at or around the specific property when the torque actually generated in the second specific cylinder is higher than the range at or around the specific torque, determines that the property level is in a level range on the heavy fuel side of the level range at or around the specific property when the torque actually generated in the second specific cylinder is lower than the range at or around the specific torque, and determines a weighted average of the fuel property level determined in the specific cylinder and the fuel property level determined in the second specific cylinder obtained by giving a higher weight to the former than to the latter as the property level of fuel to be injected into each cylinder during the engine starting process.

3. The fuel property determination system for an internal combustion engine according to claim 1, wherein the fuel property determination system starts correction of the fuel injection amounts during the engine starting process, based on the fuel property level determined, immediately after the determination.

4. A fuel property determination method for a multi-cylinder internal combustion engine, comprising:

setting fuel injection amounts into each of the cylinders during the engine starting process on the assumption that a heavy fuel will be injected;

allowing a specific torque to be generated by combustion in a specific cylinder when a fuel with a specific property between those of the heaviest fuel and the lightest fuel is injected thereinto;

determining that the property level of fuel to be injected into each cylinder during the engine starting process is in a level range at or around the specific property when the torque actually generated in the specific cylinder is in a range at or around the specific torque;

determining that the property level is in a level range on the light fuel side of the level range at or around the specific property when the torque actually generated in the specific cylinder is higher than the range at or around the specific torque; and determining that the property level is in a level range on the heavy fuel side of the level range at or around the specific property when the torque actually generated in the specific cylinder is lower than the range at or around the specific torque, decreasing a fuel injection amount so that the specific torque is generated by combustion in the specific cylinder when the fuel with the specific property is injected thereinto;

allowing a specific torque to be generated by combustion in at least a second specific cylinder when the fuel with a specific property is injected thereinto without decreasing the fuel injection amount thereinto;

determining that the property level of fuel to be injected into each cylinder during the engine starting process is in a level range at or around the specific property when the torque actually generated in the second specific cylinder is in a range at or around the specific torque;

determining that the property level is in a level range on the light fuel side of the level range at or around the specific property when the torque actually generated in the second specific cylinder is higher than the range at or around the specific torque;

determining that the property level is in a level range on the heavy fuel side of the level range at or around the specific property when the torque actually generated in the second specific cylinder is lower than the range at or around the specific torque; and determining, only when the fuel property level determined in the specific cylinder and the fuel property level determined in the second specific cylinder coincide with each other, the coincident fuel property level as the property level of the fuel to be injected into each cylinder during the engine starting process.

5. The fuel property determination method for an internal combustion engine according to claim 4, further comprising:

starting correction of the fuel injection amounts during the engine starting process, based on the fuel property level determined, immediately after the determination.

6. A fuel property determination method for a multi-cylinder internal combustion engine, comprising:

setting fuel injection amounts into each of the cylinders during the engine starting process on the assumption that a heavy fuel will be injected;

allowing a specific torque to be generated by combustion in a specific cylinder when a fuel with a specific property between those of the heaviest fuel and the lightest fuel is injected thereinto;

determining that the property level of fuel to be injected into each cylinder during the engine starting process is in a level range at or around the specific property when the torque actually generated in the specific cylinder is in a range at or around the specific torque;

determining that the property level is in a level range on the light fuel side of the level range at or around the specific property when the torque actually generated in the specific cylinder is higher than the range at or around the specific torque;

determining that the property level is in a level range on the heavy fuel side of the level range at or around the specific property when the torque actually generated in the specific cylinder is lower than the range at or around the specific torque, allowing a specific torque to be generated by combustion in at least a second specific cylinder in which combustion occurs after combustion in the specific cylinder when the fuel with a specific property is injected thereinto;

determining that the property level of fuel to be injected into each cylinder during the engine starting process is in a level range at or around the specific property when the torque actually generated in the second specific cylinder is in a range at or around the specific torque;

determining that the property level is in a level range on the light fuel side of the level range at or around the specific property when the torque actually generated in the second specific cylinder is higher than the range at or around the specific torque;

determining that the property level is in a level range on the heavy fuel side of the level range at or around the specific property when the torque actually generated in the second specific cylinder is lower than the range at or around the specific torque; and determining a weighted average of the fuel property level determined in the specific cylinder and the fuel property level determined in the second specific cylinder obtained by giving a higher weight to the former than to the latter as the property level of fuel to be injected into each cylinder during the engine starting process.

\* \* \* \* \*